United States Patent
Rall et al.

[11] Patent Number: 5,734,658
[45] Date of Patent: Mar. 31, 1998

[54] DATA COMMUNICATION SYSTEM

[75] Inventors: Bernhard Rall, Ulm; Franz Josef Petry, Kernen; Juergen Minuth, Eislingen; Thilo Kuehner, Remseck; Sebastion Grimmeisen, Waiblingen; Bernd Haeussler, Ostfildern; Juergen Dorner, Wendlingen; Wolfgang Appel, Stuttgart, all of Germany

[73] Assignee: Daimler Benz AG, Stuttgart, Germany

[21] Appl. No.: 232,048

[22] PCT Filed: Oct. 22, 1992

[86] PCT No.: PCT/EP92/02430

§ 371 Date: Apr. 26, 1994

§ 102(e) Date: Apr. 26, 1994

[87] PCT Pub. No.: WO93/08659

PCT Pub. Date: Apr. 29, 1993

[30] Foreign Application Priority Data

Oct. 26, 1991 [DE] Germany ............... 41 35 436.2

[51] Int. Cl.[6] .............. H04L 12/40; H04L 12/44; H04L 25/08
[52] U.S. Cl. .............. 370/438; 333/32; 333/124
[58] Field of Search .......... 370/94.3; 333/124, 333/125, 126, 32, 33; 375/257; 327/519, 551, 595; 307/10.1, 112, 115, 147, 438

[56] References Cited

U.S. PATENT DOCUMENTS

| | | |
|---|---|---|
| 4,646,319 | 2/1987 | Engel et al. |
| 4,707,672 | 11/1987 | Duret et al. |
| 4,803,485 | 2/1989 | Rypinski ............... 370/85.15 |
| 4,903,015 | 2/1990 | Van Steenbrugge ........ 370/85.7 |
| 4,985,892 | 1/1991 | Camarata ............... 370/124 |
| 5,313,460 | 5/1994 | Schmid ............... 370/85.1 |
| 5,317,560 | 5/1994 | Ingre et al. ............ 370/16 |

FOREIGN PATENT DOCUMENTS

| | | |
|---|---|---|
| 2321201 | 3/1977 | France. |
| 3546684 | 8/1986 | Germany. |
| 3934974 | 2/1991 | Germany. |

OTHER PUBLICATIONS

New Electronics. Incorporating Electronics Today; vol. 18, No. 16, Aug. 1985, London, GB, pp. 45–48; C.P. Wyles "Local Area Networks—Removing the Mystique".

Turinsky: "Elektrische Forderungen an einen schnellen Mikro rechnerbus". In: radio fernsehen elektronik, Berlin 39, 1990, pp. 311–314.

"Datenbus–Konzepte sollen die Fülle der Elektronik–Komponenten begrenzen". In: Blick durch die Wirtschaft, Beilage der Frankfurter Allg. 34, 1991, No. 212, Nov. 4, 1991.

*Primary Examiner*—Wellington Chin
*Assistant Examiner*—Jean B. Corrielus
*Attorney, Agent, or Firm*—Spencer & Frank

[57] ABSTRACT

In a data communication system, in particular for a motor vehicle, the transmission lines that lead to the individual terminals are interconnected at a passive network in a star configuration and are there provided with frequency-dependent attenuation means, preferably ferrite beads. Good characteristic impedance adaptation is thus obtained for suppressing high-frequency distributing signals, while retaining free choice of the system parameters for the steady data symbolic state. The system may be enlarged by means of additional star networks into a tree or meshed structure.

18 Claims, 5 Drawing Sheets

DATA COMMUNICATION SYSTEM

BACKGROUND OF THE INVENTION

The invention relates to a data communication system, particularly in motor vehicles, including a plurality of terminal units, which are connected by means of transmission lines for two-way data transfer.

For two-way data transfer between a plurality of user terminal units, BUS-systems, in particular, are known. For use in motor vehicles, which of course, are subject to particularly intense influence from interference, the CAN-BUS-system, for example, is known. In this system, the BUS line is formed by a two-wire line, each of which terminates at both ends almost reflection free by means of a terminating resistor for the useful signals. These terminal units are directly or by way of very short line segments connected to the BUS line. In flexible circuitry with different selections of terminal units, it is not defined which terminal unit is the last one at the end of the bus, i.e., where the terminating resistor must be built in.

SUMMARY OF THE INVENTION

It is therefore the object of the present invention to provide a data communication system of the above-mentioned type which tolerates different constructions in circuitry, particularly in motor vehicles, and also ensures flawless pulse transmission despite its flexibility.

According to the invention, a data communication system including a plurality of terminal units which are connected by means of transmission lines for two-way data transfer, particularly in motor vehicles, has the following characteristics:

the transmission lines form at least one star-shaped network about a passive star node (K) having a load impedance, preferably, a real resistance;

at the end of the transmission lines on the node sides, damping means are arranged which, during high frequency, transforms a portion of the effective resistance in the transmission lines; and the damping means are chosen such that from each terminal unit in the direction of the network node, the respective transmission line for high frequency appears to terminate at least approximately with its characteristic impedance.

The system according to the invention allows a range of desired configurations and, within certain limits, also a variable number of connected terminal units. It is especially advantageous that by means of the load impedance the direct voltage characteristics of the network may be defined separately from the high-frequency characteristics and especially also, for example, may be matched to the system parameters predetermined by the terminal units. By high frequency is meant in this case, the frequency range which lies significantly above the frequency of the useful signal (occasionally referred to hereinafter simply as the signal) and above the transmission rate in digital communication. During data transmission, interfering transient processes at symbol edges are effectively suppressed and reflections at the network node are prevented, while in the steady state damping means are without effect and the network parameters are essentially only given by the load impedance. In this case, it is assumed that the contacts of non-transmitting terminal units are high impedance in relation to the characteristic impedance of the transmission lines.

The damping means are preferably damping beads of ferrite material. Materials having an initial permeability of approximately 2,000 are preferably used.

In a network configuration having a plurality of star networks in which each has a plurality of transmission lines which are joined at a star node and which are connected to terminal units, the star nodes are connected to one another via connecting transmission lines, preferably in the manner of a tree structure. In a tree structure, there is only one connecting path between any two terminal units, while in a meshed structure, two or more of such connecting paths are present. A tree structure, for example, in a motor vehicle, is of particular advantage if a first group of terminal units, for example, control devices under the hood of the vehicle, must be connected in a system with a second group, for example, in the trunk. The first group may be combined in a first star network, the second in a second star network, and one sole connecting transmission line between the front and the rear suffices for connecting the two spatially separate star nodes. The structure may be enlarged by means of further star networks, etc. As a result, the load resistance within the system only occurs once and is preferably arranged concentrically in a central star node.

The connecting lines are configured similarly to the transmission lines and are, like the latter, provided with damping means on each of the connected star nodes. The particular advantage in this case, in addition to the independence of the position of the star node including the load resistor, is the freedom in the wiring, on the one hand, and the circuitry, on the other hand. The damping means in their particularly chosen dimension and arrangement ensure a terminating resistance at high frequencies for common mode and push-pull or differential signal proportions. Minor termination failures are not critical, because the reflected power decreases if the reflection factor is squared.

BRIEF DESCRIPTION OF THE DRAWINGS

The invention is elucidated in detail below by way of the embodiments and with reference to the drawings in which.

DESCRIPTION OF THE PREFERRED EMBODIMENT

Figure 1:
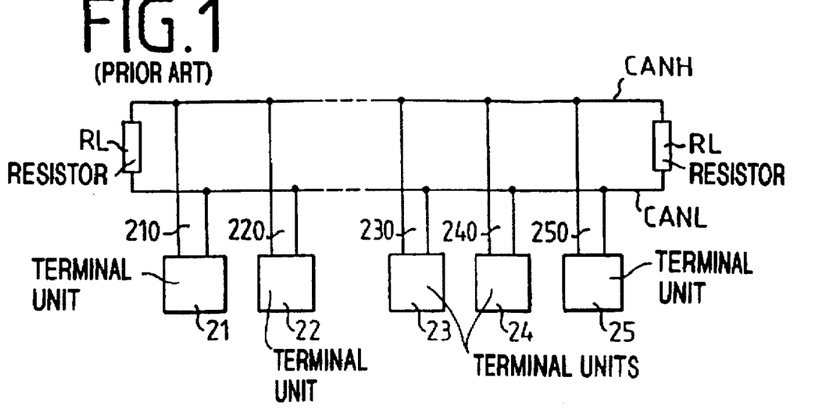
FIG. 1 shows is the conventional arrangement of a BUS line including terminating resistors and a plurality of terminal units.

In the CAN-BUS system sketched in FIG. 1 as an example, a two-conductor line having conductors CANH and CANL forms a transmission line, which has a characteristic impedance Z and terminates reflection-free at both ends in the load resistors RL=Z. Control units 21 to 25 serve as user end terminal units, and are connected via connector lines 210 to 250 with the BUS line. If the connector lines are sufficiently short, each control unit 21 to 25 experiences an impedance of Z/2, measured into the BUS line, with all of the non-transmitting terminal units being assumed to be high impedance with respect to Z/2, and as a rule, the BUS line is only charged with sending signals by one terminal unit. If the sketched BUS system is desired to be varied and, for example, the BUS line is to be lengthened at the control device 25, where one of the terminating resistors was just arranged, the latter would have to be removed and be connected to the new control device which is now further away. The sketched system proves to be relative inflexible on account of this reconstructive requirement.

Figure 2:
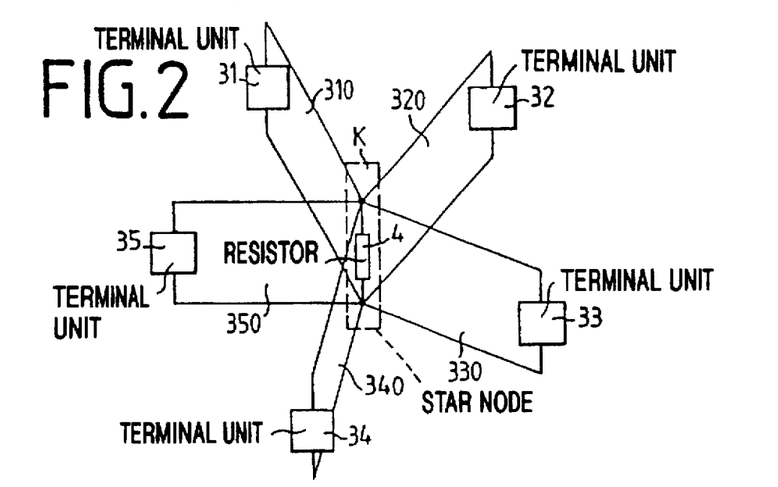
FIG. 2 shows a star-shaped arrangement of data lines.
Figure 3:
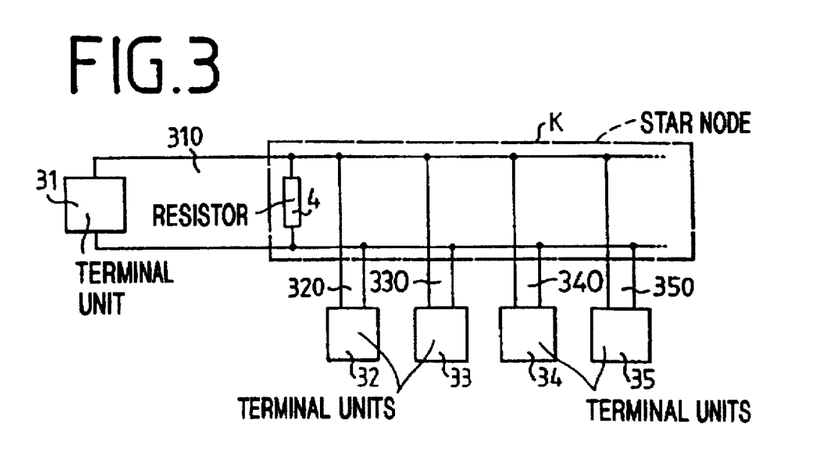
FIG. 3 is a planar view of the topology of FIG. 2.

In the system sketched in FIG. 2 and FIG. 3, the control units or terminal units 31 to 35 are connected to one another in the form of a star via a star node by way of transmission lines 310 to 350. In star node K, an ohmic load resistor 4 is arranged as a core resistor having the value RK. If the same system parameters for data transmission as those in the system according to FIG. 1 are assumed, the core resistor RK in FIG. 2 assumes the function of the two terminal resistors RL and RK=RL/2=Z/2 must be chosen, with Z being the characteristic impedance of transmission lines 310 to 350. The transmission lines are no longer limited in this system and may, for example, easily reach lengths up to 40 m in longer utility vehicles. The signal edges, having a typical duration of 10 ns and occurring in data transmission using CAN-BUS components, exhibit harmonics of up to some $10_8$ Hz at not insignificant amplitudes. The wavelength of these harmonics on cables may be short as 50 cm, so that the occurring cable lengths are long in relation to these wavelengths. Observations of the impedance ratio for the single edge harmonics show that a terminal unit, parallel to the core resistor in the network node, sees the transmission lines to the other terminal units as having the impedance Z. As the number of terminal units increases, the resulting core impedance in the star node K approaches 0. If on the side of a sending terminal unit idling occurs, the line in the star node is practically short-circuited for the signal edges moving back and forth so that strong and transient processes which interfere with the environment result at each signal edge. After the transient time, the state of the system is determined by the terminal units, and the core resistor RK, and the same voltage as that at the core resistor lies at the high impedance inputs of all non-sending terminal units. In the transient state, the system according to FIG. 2 can now be considered the same as the system sketched in FIG. 1.

Figure 4A:
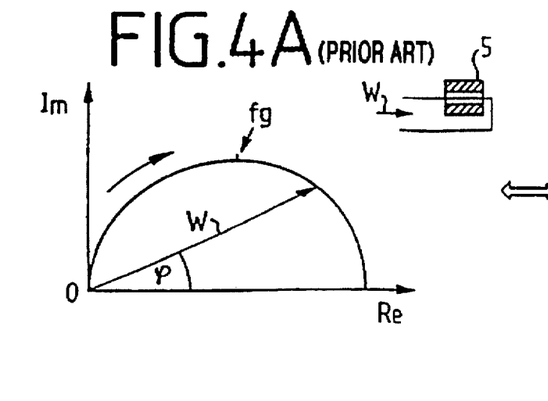
FIGS. 4A and 4B show the idealized curve of locus of impedance of a damping bead and its circuit diagram of the first order.
Figure 4B:
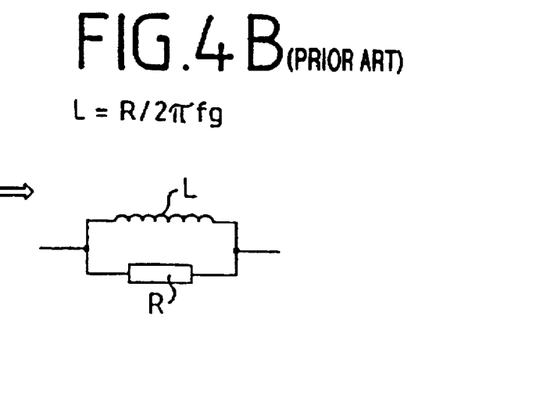
Figure 5:
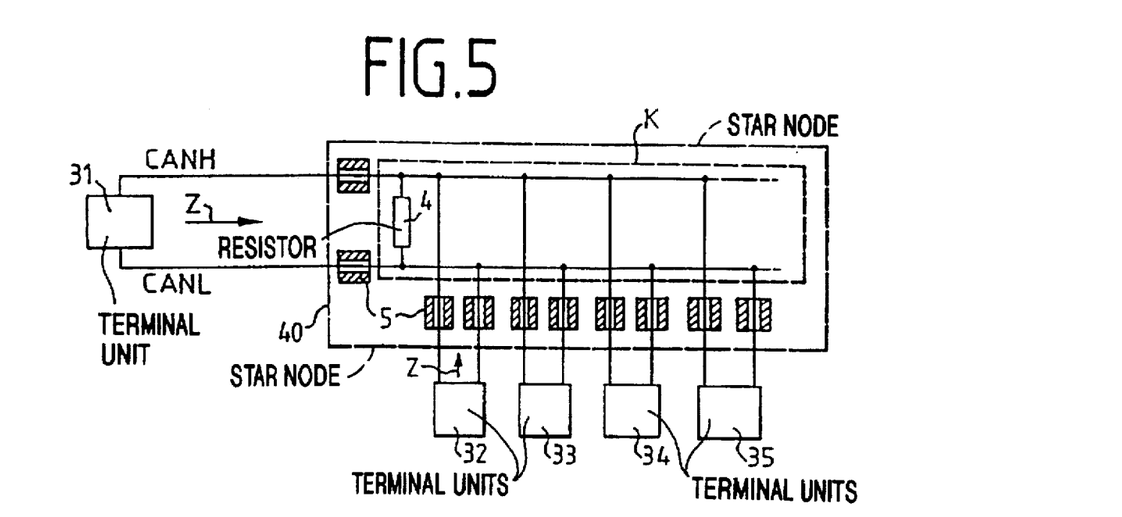
FIG. 5 is the arrangement according to the invention including damping beads at high-frequency characteristic impedance matching.

Essential is further the specific use of damping means, for example, damping beads of ferrite material, which are known per se and commonly used. In order to explain their function, a plurality of essential characteristics are sketched by way of FIGS. 4A and 4B. If the impedance of a wire loop, onto which a damping bead 5 was pushed, is measured according to quantity and phase, the result is an approximately semicircular locus curve (FIG. 4A) in the complex resistance plane Re-Im for impedance W as a function of the frequency f. For this impedance W a simple simulation as a parallel circuit of an inductive and an ohmic resistor (FIG. 4B) is possible and means the following: for low frequencies, the bead is a short circuit (first currents of a few amperes interrupt on account of premagnetization). For high frequencies, an approximately real resistance, whose value is only a function of geometry, more precisely, a function of the length of the bead and ≈10Ω/mm is transformed into the line. For medium frequencies the resistance W transformed into the line is complex. Depending on the material used, the point fg (limiting frequency) ($\psi=45°$) lies at different frequencies. If the initial permeability $\mu_r$=2000, fg=4 MHz; if $\mu_r$=900, fg=9–10 MHz; and if $\mu_i$ 250, fg=25 MHz so that roughly estimated $$\mu_r\cdot fg=6000\text{–}8000 \text{ MHz}$$

may be given. The material and length for the embodiments of damping beads most suitable in the individual case may thus be easily determined by the person of skill in the art. In FIG. 5, a system according to the invention is sketched in which, as in FIG. 2 and FIG. 3, a plurality of terminal units 31 to 35 are connected to one another via a star arrangement of transmission lines that come together by way of a star node 40. A damping bead 5 is arranged on each conductor end of the transmission lines on the star node side. The resulting core impedance for high frequency signal portions in the region of signal edges, seen from a terminal unit in the direction of the star node, is the result of the cooperation between the value RK of the core resistance 4 in the star node, the transmission lines, and the influence of the damping beads. The core resistance in the star node together with the terminal units determine the behavior of the system in the transient state. However, if, for example, the same components are selected for the system components in a star arrangement as for the BUS system according to FIG. 1, then RK=Z/2.

In the system according to FIG. 3 with its many branches, the resulting core impedance ZK is too low for the high-frequency signal portions in relation to the impedance Z of the transmission lines, and the described interfering transient processes occur at the edges of the signal. In order to effectively prevent the frequent back and forth movement of the waves on the transmission lines, the goal for each transmission line to the star node is to have an impedance of Z, i.e., the resulting resistance from each terminal unit, measured into the transmission lines, for example, with a pulse reflectometer equals Z. This is accomplished in that the damping beads, due to the portion of effective resistance, complement the low resistance of the core to Z. If the value of the effective resistance, transformed by a damping bead into the transmission line, is designated R, the result in a paired arrangement of damping beads on both conductors of a two-conductor transmission line is a resistance r=2R for each transmission line. The impedance of the star node for any desired quantity of n transmission lines is then the result of the parallel circuit of the core resistance 4 having a value of RK and the other (n−1) transmission lines, each of which has an impedance of Z+r. If one looks into the arrangement from the line and sees "personal beads+star nodes" (upstream from the beads), the personal line is supposed to be terminated with its impedance Z. The node may be considered a parallel circuit of the core resistance (RK=Z/2) having (n−1) lines with beads, therefore $$Z=r+\text{node impedance}$$

$$Z-r=(Z/2)\|(Z+r)/(n-1)$$

or $$1/(Z-r)=2/Z+(n-1)/(Z+r)$$

From this equation, r may be determined as a function of the number n of the transmission lines connected to the network node as:

$$r(n)=(Z/4\sqrt{}\sqrt{n^2+8n}-n)$$

The table lists some of the values for r(n):

| n | r(n) |
|---|------|
| 2 | 0.618 Z |
| 4 | 0.732 Z |
| 5 | 0.765 Z |
| 6 | 0.791 Z |
| 10 | 0.854 Z |

It shows that r still varies only slightly for greater n, and a value between 0.8 Z and 0.85 Z may be accepted as a good approximation for r.

Knowing these circumstances makes it easy to select the most suitable damping beads in the individual case on the basis of measurements and ferrite material. Essentially, the approximate effective resistance R is determined by way of the length of the damping beads, while a time constant in relation to the steep pulse edges may be set due to the selection of the ferrite material. Due to the time constant to be selected with the help of the material, the steep inclining edge is flattened (to a small base by means of real core impedance). In case of a high-frequency mismatch, damped transient processes due to multiple reflections are observed. The frequency of these processes is inversely proportional to the length of the line, while damping is a function of the quality of the line and the mismatch. The time constant $\tau=1/2\pi fg$ of the beads is advantageously equal or greater than twice the running time on the longest transmission line, and for the secure scanning in accordance with ISO standards is shorter than 0.15T with T being the duration of the symbol of the data to be transferred. Long lines may, as the case may be, receive beads having greater time constants than short lines. A further advantage of this arrangement is that high-frequency interferences from one line reach the low-impedance core and are strongly damped. For example, if n=6 and r=0.8 Z, a high frequency interference, coupled into a transmission, is damped by approximately 27 dB up to another terminal unit.

Figure 6A:
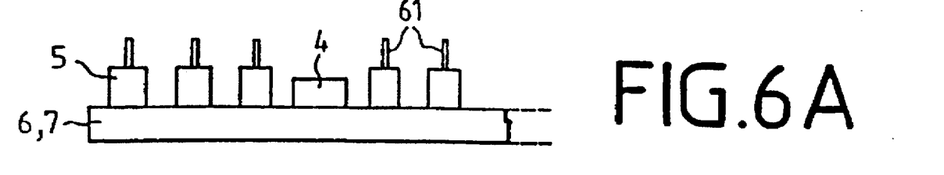
FIGS. 6A and 6B show an embodiment of a star node including a load resistor.
Figure 6B:
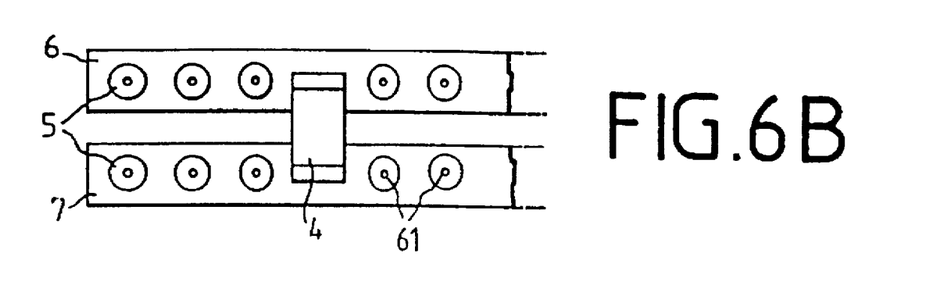

FIGS. 6A and 6B show a practical configuration of the star node 40 in FIG. 5, which also includes damping beads. The closely adjacent copper tracks 6 and 7 provide low inductivity to the core resistance 4; copper nails 61 serve as contact pins for the damping beads 5.

The afore-mentioned measure for suppressing high-frequency interference signals relates to push-pull or differential interferences. The treatment of common mode interferences by means of a characteristic impedance match presupposes defined characteristic impedance conditions which are only present in a symmetrical cable having parallel reference ground conductors, for example, a screen. (Common mode relationships are examined in that theoretically both conductors of the symmetrical line are merged into one conductor or they are connected in parallel).

Figure 7A:
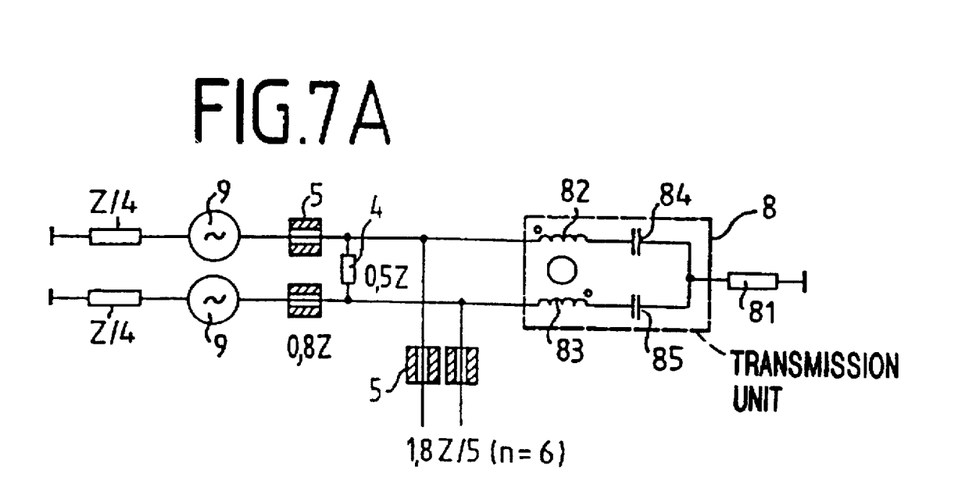
FIGS. 7A and 7B show an arrangement for the characteristic impedance matching of the common mode signals.
Figure 7B:
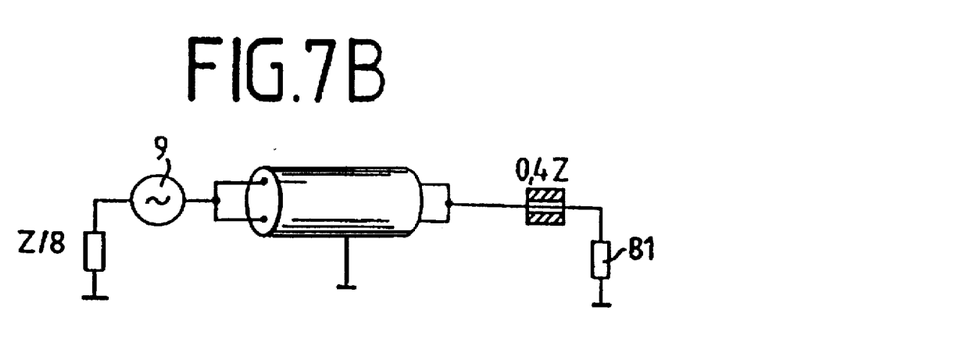

FIG. 7A shows the equivalent circuit of a common mode coupling as provided in a CAN-BUS system in which the transmitter is supplied via Z/4, respectively. Since the entire symmetric wiring is assumed to be galvanic without ground, a point-shaped contact does not exist anywhere with respect to ground or to the screen potential. Although there are capacities of summing lines with respect to the screen that are high, and characteristic impedances for common mode waves are between 30 and 50 Ω, there is no precise line termination that is able to destroy common mode waves and line resonance by means of antenna influences. This is the reason for inserting the transmitter transmission unit 8 in FIG. 7A which contains two windings 82, 83 and two capacitors 84 and 85 and which short circuits the core for the common mode waves. The transmission unit may include, for example, a simple single aperture core choke of dual-wire turned with a few windings. The terminal resistance may be increased by means of the impedance 81, which may be a resistor or a damping bead. The transmission unit is high impedance for push-pull or differential voltages. In the circuit diagram of FIG. 7B, the line for common mode voltages (in FIG. 7A represented by voltage sources 9) is closed at 0.4 Z (if n=6) and R81. As a result, it is rendered ineffective for the system. In this case, 0.4 Z is the parallel circuit of two damping beads on the lines in FIG. 7A each having 0.8 Z, and the effect of the transmission unit 8 is considered a short circuit for the common mode signals.

Figure 8:
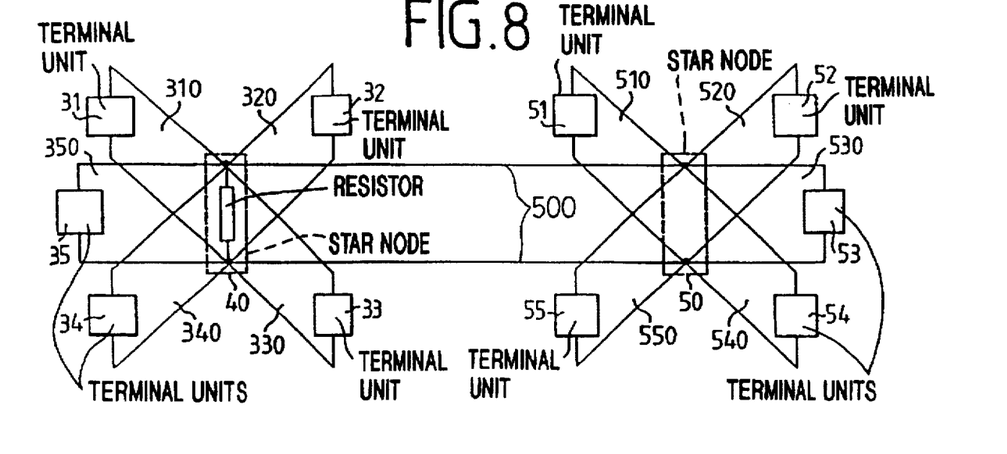
FIG. 8 shows an arrangement having two connected star networks.

The expansion of the system for a transmission line network, sketched and described in detail with only one star network, into a plurality of mutually connected star networks within a system is illustrated below by way of the systems sketched in FIG. 8 and FIG. 9 which show, for reason of clarity, only two star networks and only explain in greater detail those deviations and expansion that are in contrast with the previously described system.

In addition to a first star network having a star node 40, previously referred to as a central star node and including connecting a plurality of transmission lines 310, 320, . . . . which connect terminal units 31, 32, . . . , there is a second star network in which terminal units 51, 52, . . . are connected to a second star node 50 by way of transfer lines 510, 520, . . . . . In contrast to node K, including core impedance 40, this star node 50 is not provided with an impedance as the described core resistor 4. Node 50 is connected with node 40 by way of a connecting transmission line 500. The connecting transmission line is the same type of line as the transmission lines 31, 32, . . . and 51, 52, . . . . and may then also be considered as a connection of the two transmission lines, which are open at the ends, between the two nodes. Each star is equipped at each transmission line, including the connecting transmission line 500, with damping beads 5 and as described above. The compact configuration of the nodes is again important in this regard.

Figure 9:
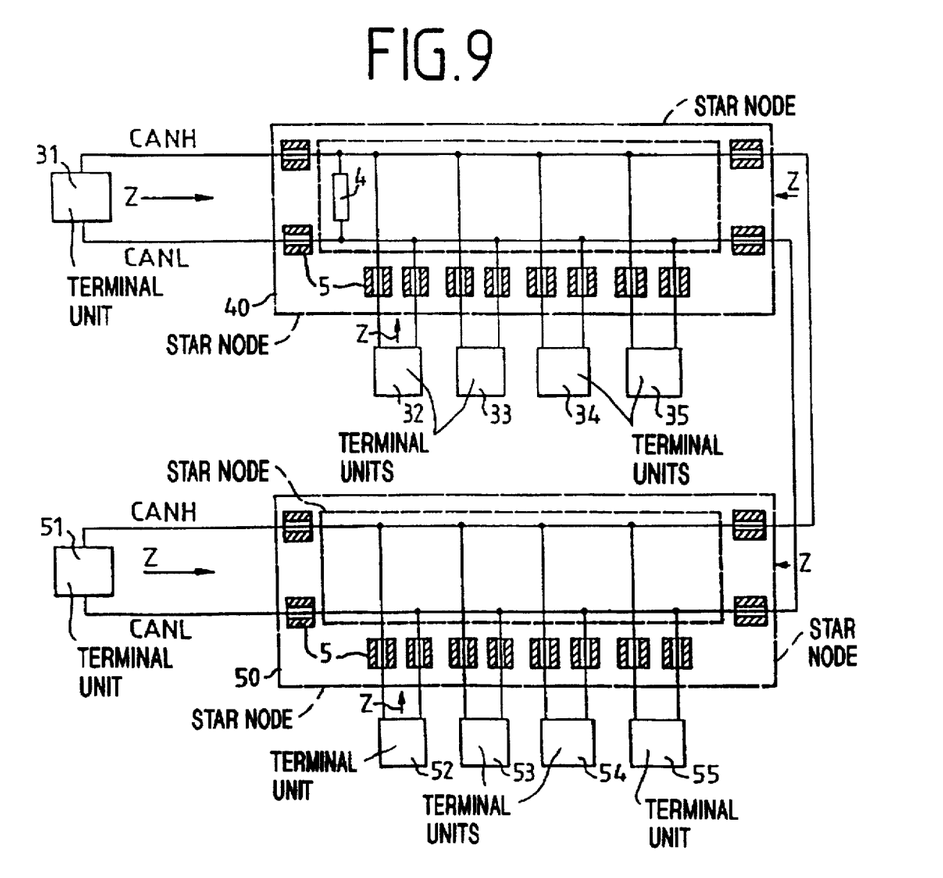
FIG. 9 is a planar view of the topology of FIG. 8.

If, in FIG. 9, one looks from the line into one of the nodes 40 or 50, a node input impedance symmetric or balanced to Z may be seen for the high frequency, independent of the input impedances of the terminal units.

Figure 11:
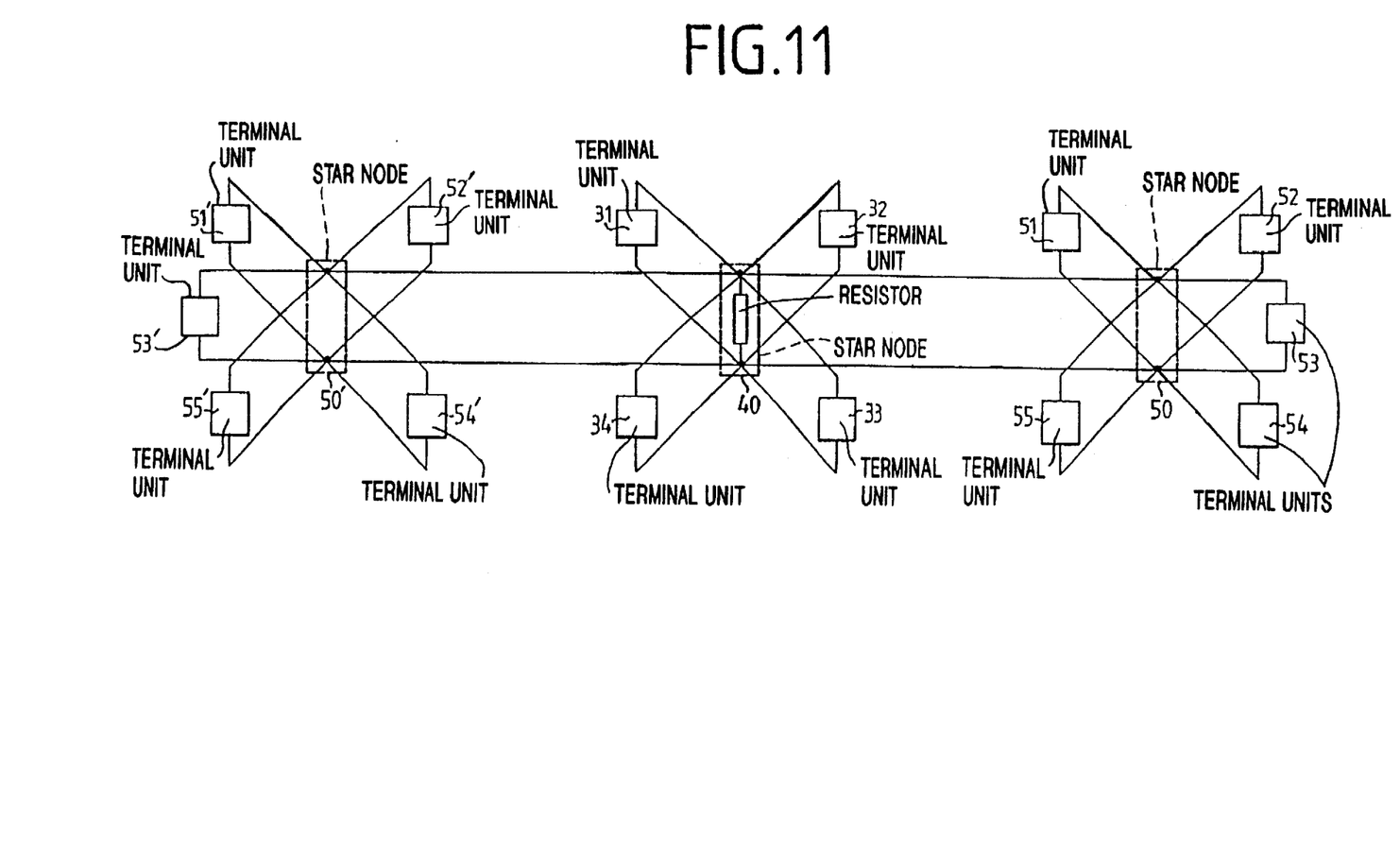
FIG. 11 illustrates a modification of the arrangement shown in FIG. 8.

Asymmetrically, the star node 50 does not terminate with respect to ground and would, if correspondingly excited, function as a capacititively charged antenna. This may be prevented, if the star node 50 is provided with a transmission unit 8, 81 as sketched in FIG. 7A. The described system, having two star networks as sketched in FIG. 8 and FIG. 9, may be expanded by further star networks in that the star nodes of each further network are connected in the manner of a mesh structure, as the star network of the second star network, in the manner of a tree structure, with one of the present nodes by way of a connecting transmission line such as line 500 or with connection redundance with two or a plurality of star nodes. A simple example of an expanded network is illustrated in FIG. 11, where the arrangement shown in FIG. 8 has been expanded to include a further star node 50' for a further star-shaped network to connect terminal units 51', 52', 53', 54', and 55'.

The only restriction in the configuration of the system is basically only the data rate of the expanding network. At a digital transmission rate of 1 MBit/sec, the CAN-BUS method permits signal transit times up to 150 ns. If the calculated source resistance of a CAN transmitter is 60Ω, and a load of 60Ω also, a parallel capacity of 5 nF may be loaded for a time constant of 150 ns, corresponding to a total line length of 65 m, if a four-wire star cable is used. These types of line lengths will hardly be reacted in a system configuration according to the invention.

Figure 10:
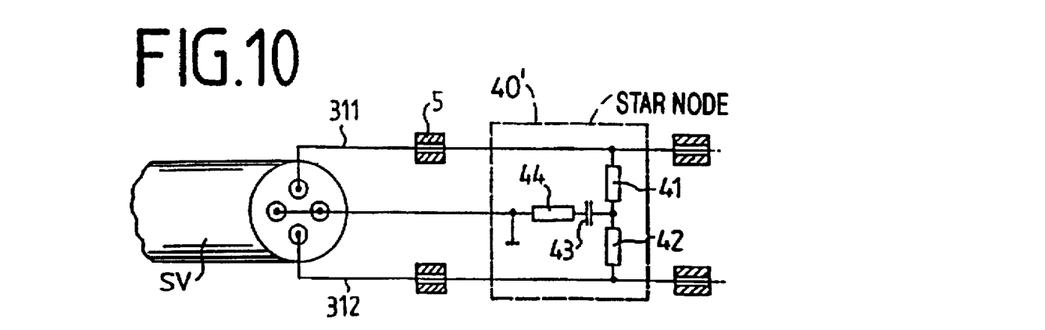
FIG. 10 shows a modification of the lines as four-wire star cable including an advantageous configuration of a central star node for the same.

A transmission line 310 configured as a four-wire cable SV and its connection to a central star node 40' is sketched in FIG. 10, with resistors 41, 42, 44 for the core impedance 4 and a capacitor 43 being provided in the star node 40' in such a way that resistors 41, 42 of equal size lie in series between lines 311 (CANH) and 312 (CANL) and their common connecting point is connected via a series circuit of capacitors 43 and resistor 44 with wires of the four-wire star cable having the reference potential GND (ground), and preferably also with a ground connection internal to the node. The four-wire star cable has an asymmetrical characteristic impedance of, for example, 35Ω. The damping beads 5 are chosen with respect to material and geometry in such a way that, as already described in detail, the damping beads for high frequency together cause an effective resistance of 80 to 85 percent of the symmetric characteristic impedance, which, for example, is 100Ω. For a reflection free termination with respect to ground at an effective resistance of the beads of 40Ω each, in accordance with dimensioning rules that are commonly known, the resistor 44 may be 2.5Ω and resistors 41 and 42 may equal 25Ω each. A minor termination failure caused by setting the resistor 44 to zero, only causes less than 1% of the power to be reflected. If the same cable is used in a system according to a CAN specification, i.e., having a load resistance of 60Ω, a precise termination with respect to ground is obtained with 30Ω for resistors 41, 42, respectively, zero for 44, and 40Ω as the resistance of the damping beads a precise termination with respect to ground. An additional termination in accordance with elements 8, 81 in FIG. 7 is then not required.

The special advantage of the invention is the fact that the use of very economical components allows optimization of the system in order to prevent the transient oscillations of the useful signal and to dampen the conduction of high-frequency interferences. Transmitters, which may also be configured as inductor, symmetrize or balance the star nodes and short-circuit common-mode interferences against ground reference conductors without a load on the useful signal. The same relationships are also valid for unscreened lines, however, the characteristic impedance for common mode signals then lies is the range of 150–200Ω.

We claim:

1. An improved data communication system including a plurality of terminal units which are connected by transmission lines for two-way data transfer, wherein the improvement comprises:

the transmission lines form a star-shaped network about a passive star node having a common load impedance for the transmission lines, the transmission lines having node-side ends that are connected to the star node;

at the node-side ends of the transmission lines, damping means are arranged which, during high frequency, modify the effective impedance in the transmission lines; and the damping means are chosen such that from each terminal unit, in the direction of the star node, the respective transmission line is terminated for high frequency with approximately with its characteristic impedance.

2. A system according to claim 1, wherein the transmission lines are symmetrical lines, each transmission line including a pair of conductors, and wherein damping means having equal characteristics are arranged on both conductors of each transmission line.

3. A system according to claim 1, wherein the damping means comprise damping beads of ferrite material.

4. A system according to claim 1, further comprising means for balancing the star node in such a way that common-mode signals are short circuited and differential signals encounter a high impedance.

5. A system according to claim 4, wherein the means for balancing comprises an auxiliary impedance component which helps terminate correctly the node for common-mode signals in accordance with the characteristic impedance.

6. An improved data communication system including a plurality of terminal units which are connected by transmission lines for two-way data transfer, wherein the improvement comprises:

the transmission lines form a star-shaped network about a passive star node having a common load impedance for the transmission lines, the transmission lines having node-side ends that are connected to the star node;

at the node-side ends of the transmission lines, damping means are arranged which, during high frequency, modify the effective impedance in the transmission lines;

the damping means are chosen such that from each terminal unit, in the direction of the star node, the respective transmission line is terminated for high frequency with approximately with its characteristic impedance;

an additional star-shaped network having an additional star node without a load impedance;

connecting lines having ends which are connected to the star nodes to link the star-shaped networks; and further damping means arranged at the ends of the connecting lines.

7. A system according to claim 6, further comprising at least one further star-shaped network having at least one further star node, and wherein the load impedance is disposed in a central one of the star nodes.

8. A system according to claim 6, wherein the connecting lines are the same type of lines as the transmission lines.

9. An improved data communication system including a plurality of terminal units which are connected by transmission lines for two-way data transfer, wherein the improvement comprises:

the transmission lines form a star-shaped network about a passive star node having a common load impedance for the transmission lines, the transmission lines having node-side ends that are connected to the star node;

at the node-side ends of the transmission lines, damping means are arranged which, during high frequency, modify the effective impedance in the transmission lines; and the damping means are chosen such that from each terminal unit, in the direction of the star node, the respective transmission line is terminated for high frequency with approximately with its characteristic impedance;

wherein the real value of resistance of the load impedance is at least approximately equal to half the characteristic impedance of the transmission lines.

10. An improved data communication system including a plurality of terminal units which are connected by transmission lines for two-way data transfer, wherein the improvement comprises:

the transmission lines from a star-shaped network about a passive star node having a load impedance, the transmission lines having node-side ends that are connected to the star node;

at the node-side ends of the transmission lines, damping means are arranged which, during high frequency, modify the effective impedance of the transmission lines;

the damping means are chosen such that from each terminal unit, in the direction of the star node, the respective transmission line is terminated for high frequency with approximately its characteristic impedance;

the damping means comprise damping beads of ferrite material; and the ferrite material of the damping beads is selected such that the damping beads impart a time constant which is small in relation to the duration of a transmitted data symbol and high in relation to a high frequency interfering signal occurring in the network.

11. A system according to claim 10, wherein the time constant is equal or greater than double a signal propagation time on the longest transmission line.

12. A communication system for use with terminal units, comprising;

a plurality of transmission lines having inner ends and outer ends, the outer ends of the transmission lines being coupled to the terminal units, each transmission line including first and second conductors;

a load impedance connected to the inner ends of the transmission lines, the load impedance having a first terminal which is connected to each of the first conductors and a second terminal which is connected to each of the second conductors; and damping means, disposed at the inner ends of the transmission lines, for modifying the reactance of the transmission lines at high frequency so that the inner end of each of the transmission lines is terminated with approximately its characteristic impedance.

13. The communication system of claim 12, wherein the damping means comprises ferrite material which is disposed adjacent the first and second conductors of the transmission lines.

14. The communication system of claim 12, wherein the damping means comprises ferrite beads around the first and second conductors.

15. The communication system for claim 14, further comprising a first metal track connected to the first terminal of the load impedance and a second metal track connected to the second terminal of the load impedance, the first conductors being connected to the first metal track at spaced-apart positions and the second conductors being connected to the second metal track at spaced-apart positions, the ferrite beads being mounted on the tracks.

16. The communication system of claim 15, wherein the load impedance is a resistor.

17. The communication system of claim 16, wherein the metal tracks are substantially parallel.

18. The communication system of claim 12, wherein the load impedance is a resistor.

* * * * *